M. E. BATES & D. H. NOTHDURFT.
WHIFFLETREE GUARD.
APPLICATION FILED MAR. 16, 1912.

1,052,305.

Patented Feb. 4, 1913.

Witnesses
Carroll Bailey
John J. McCarthy

Inventors
M. E. Bates,
D. H. Nothdurft,
By Victor J. Evans
Attorney

UNITED STATES PATENT OFFICE.

MILTON E. BATES AND DANIEL H. NOTHDURFT, OF OTIS, KANSAS.

WHIFFLETREE-GUARD.

1,052,305.     Specification of Letters Patent.     Patented Feb. 4, 1913.

Application filed March 16, 1912. Serial No. 684,237.

*To all whom it may concern:*

Be it known that we, MILTON E. BATES and DANIEL H. NOTHDURFT, citizens of the United States of America, residing at Otis, in the county of Rush and State of Kansas, have invented new and useful Improvements in Whiffletree-Guards, of which the following is a specification.

This invention relates to improvements in guards for whiffletrees and the like and has particular application to a guard for preventing the lines or reins of the draft animal becoming entangled with the swingletrees on the whiffletree.

In carrying out our invention, it is our purpose to provide a guard of this type whereby the space between the swingletrees on the whiffletree may be spanned so as to prevent the lines being caught in the swingletrees.

With the above and other objects in view, the invention consists in the construction, combination and arrangement of parts hereinafter set forth in and falling within the scope of the appended claim.

Figure 1:
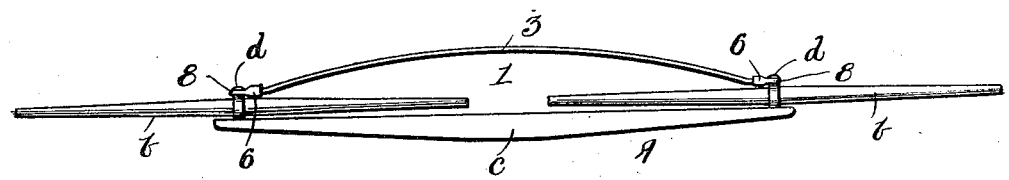
Figure 2:
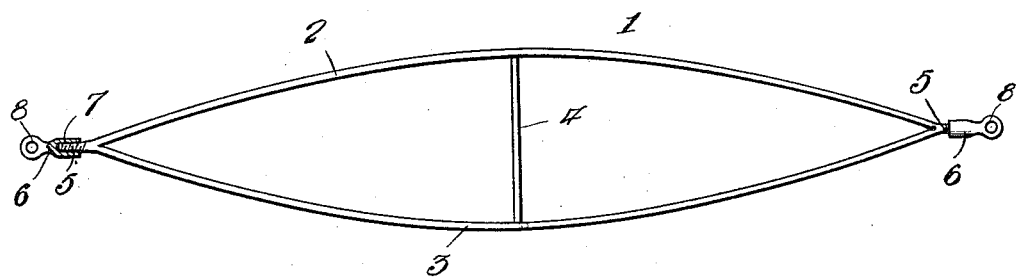

In the accompanying drawing; Figure 1 is a front elevation of a whiffletree equipped with the present invention, and Fig. 2 is a detail perspective view of the guard detached from the whiffletree.

Similiar reference characters designate like parts throughout the several views.

Referring now to the accompanying drawing in detail, a doubletree is designated at A and embodies the swingletrees $b$, $b$ attached to the outer ends of the connecting bar $c$ by means of bolts $d$, the whiffletree being adapted for attachment to a vehicle tongue.

The guard, in the present instance, consists of a frame 1 of an arcuate outline and composed of the bars 2 and 3 connected to each other intermediate their ends by means of a cross piece 4. Upon the opposite sides of the cross piece, the bars 2 and 3 converge inwardly toward each other and terminate, at their opposite extremities, in threaded shanks 5, each of which is designed to receive a connector 6 provided with a socket 7 threaded interiorly to receive the shank 5 and formed to provide an eye 8, which eyes are designed to receive the bolts $d$ at the opposite extremities of the connecting bar $c$ of the whiffletree so as to support the frame 1 of the guard upon said whiffletree.

From this construction, it will be seen that contact between the lines and the whiffletree is avoided thereby eliminating twisting of the lines about the swingletrees. Furthermore, it will be noted, owing to the arcuate shape of the guard, that the same may be adjusted or adapted to doubletrees of various lengths and at the same time be held away from the swingletrees so that the latter will swing freely beneath the guard and without contacting therewith.

We claim:

The combination with a doubletree, of a guard adapted to be secured to the swingletrees on said doubletree and span the space between the swingletrees to prevent the reins being entangled with the swingletrees, said guard comprising an arcuate-shaped frame consisting of spaced bars converging toward each other at their opposite extremities and terminating in threaded shanks, and connectors threaded onto said shanks and each formed with an eye whereby the guard may be attached to the doubletree.

In testimony whereof we affix our signatures in presence of two witnesses.

MILTON E. BATES.
    DANIEL H. NOTHDURFT.

Witnesses:
    ELMER TUELL,
    ALEXANDER MOORE.